United States Patent
Suzuki et al.

(10) Patent No.: US 6,680,112 B1
(45) Date of Patent: Jan. 20, 2004

(54) MAGNETIC RECORDING MEDIUM AND PRODUCTION PROCESS THEREOF

(75) Inventors: Mikio Suzuki, Chiba (JP); Kimie Takagi, Chiba (JP); Wenqiang Lu, Chiba (JP); Hiroshi Daio, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 185 days.

(21) Appl. No.: 09/593,142

(22) Filed: Jun. 14, 2000

Related U.S. Application Data
(60) Provisional application No. 60/147,008, filed on Aug. 3, 1999.

(30) Foreign Application Priority Data

Jun. 29, 1999 (JP) .................................. 11-184351

(51) Int. Cl.$^7$ ................................................ G11B 5/72
(52) U.S. Cl. ................ 428/336; 428/408; 428/694 TC; 427/131; 427/535; 427/577
(58) Field of Search ................... 427/577, 131, 427/534, 535, 539; 216/67, 71, 81; 428/336, 694 TC, 694 TF, 408

(56) References Cited

U.S. PATENT DOCUMENTS

| | | | |
|---|---|---|---|
| 4,861,662 A | * 8/1989 | Kobliska et al. | 428/408 |
| 5,409,738 A | * 4/1995 | Matsunuma et al. | 427/502 |
| 5,773,124 A | * 6/1998 | Ishikawa et al. | 428/141 |
| 5,776,602 A | * 7/1998 | Ueda et al. | 428/332 |
| 5,837,357 A | * 11/1998 | Matsuo et al. | 428/212 |
| 6,001,431 A | * 12/1999 | Itoh et al. | 427/569 |
| 6,106,737 A | * 8/2000 | Tomoyasu et al. | 216/67 |
| 6,171,674 B1 | * 1/2001 | Yamazaki et al. | 428/644 |
| 6,338,777 B1 | * 1/2002 | Longstreth White | 204/192.15 |

FOREIGN PATENT DOCUMENTS

| | | |
|---|---|---|
| EP | 0 461 834 A2 | 6/1991 |
| EP | 0 671 728 A2 | 2/1995 |
| JP | 08013143 A | 1/1996 |
| JP | 08161736 A | 6/1996 |
| JP | 2000-105916 | 4/2000 |

OTHER PUBLICATIONS

Communication from Singapore Patent Office.
Patent Abstracts of Japan, abstracting JP 2000–105916 of Apr. 11, 2000.
Patent Abstracts of Japan, abstracting JP 61–057042 of Mar. 22, 1986 Derwent abstract, abstracting JP 61–057042 of Mar. 22, 1986.
Patent Abstracts of Japan, abstracting JP 11–316949 of Nov. 16, 1999.
Patent Abstracts of Japan, abstracting JP 11–288515 of Oct. 19, 1999.
Patent Abstracts of Japan, 08–161736, Jun. 21, 1996, Nosaka Yoshihiro, Mitsubishi Chem. Corp.
Patent Abstracts of Japan, 08–013143, Jan. 16, 1996, Sasaki Shinji, et al., Hitachi Ltd.

* cited by examiner

*Primary Examiner*—Stevan A. Resan
(74) *Attorney, Agent, or Firm*—Sughrue Mion, PLLC (57) ABSTRACT

A process for producing a magnetic recording medium, which comprises the steps of forming a non-magnetic undercoat film and a magnetic film on a non-magnetic substrate; forming a carbonaceous protective film thereon through plasma CVD to produce a disk D; etching the surface of a carbonaceous protective film in an etching apparatus 2 by use of plasma generated from an etching gas; and forming a lubricating film on the carbonaceous protective film surface.

2 Claims, 3 Drawing Sheets

MAGNETIC RECORDING MEDIUM AND PRODUCTION PROCESS THEREOF

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/147,008 filed Aug. 3, 1999 pursuant to 35 U.S.C. §111(b).

FIELD OF THE INVENTION

The present invention relates to a magnetic recording medium used in, for example, a magnetic disk apparatus, and to a production process for the medium.

BACKGROUND OF THE INVENTION

A conventionally employed magnetic recording medium comprises a non-magnetic substrate having a non-magnetic undercoat film and a magnetic film thereon; a protective film such as carbon film provided thereon; and on the protective film a lubricating film comprising a lubricant such as perfluoropolyether.

In recent years, a magnetic recording medium which can reduce spacing loss has been demanded for enhancing recording density of the medium.

A carbonaceous protective film is typically formed through sputtering. However, when a thin protective film; i.e., a protective film as thin as 100 Å or less, is produced through sputtering so as to reduce spacing loss, the film might have poor durability.

Therefore, there has been proposed a plasma CVD process which can be used to form a carbonaceous protective film having sufficient durability even when the formed film is thin.

However, in a magnetic recording medium produced through the above-described conventional technique lubricant adheres easily to a magnetic head, and fly-stiction characteristics might be deteriorated.

When fly-stiction characteristics are deteriorated, the flying stability of a magnetic head decreases, and problems such as head crush easily occur, due to contact between the protective film and the magnetic head.

SUMMARY OF THE INVENTION

Accordingly, the present invention provides a production process for a magnetic recording medium, which process comprises etching the surface of a carbonaceous protective film using plasma generated from an etching gas prior to formation of a lubricating film.

During etching of the surface of the carbonaceous protective film, high-frequency electric power may be applied to a disk on which the carbonaceous protective film is formed, to thereby generate plasma.

In the present invention, there is provided a magnetic recording medium produced through the above-described production process, where the surface of the carbonaceous protective film of the medium contains oxygen in an amount of about 2.9–12% as measured through X-ray photoelectron spectrometry.

Preferably, the carbonaceous protective film has a B/A value as defined hereinafter of about 1.22–1.65 as measured through Raman spectrometric analysis.

Alternatively, a magnetic recording medium produced through the above-described production process is provided, where the surface of the carbonaceous protective film of the medium contains nitrogen in an amount of about 5.0–16.5% as measured through X-ray photoelectron spectrometry.

Preferably, the carbonaceous protective film has a B/A value of about 1.21–1.52 as measured through Raman spectrometric analysis.

DESCRIPTION OF THE PREFERRED EMBODIMENTS

Figure 1:
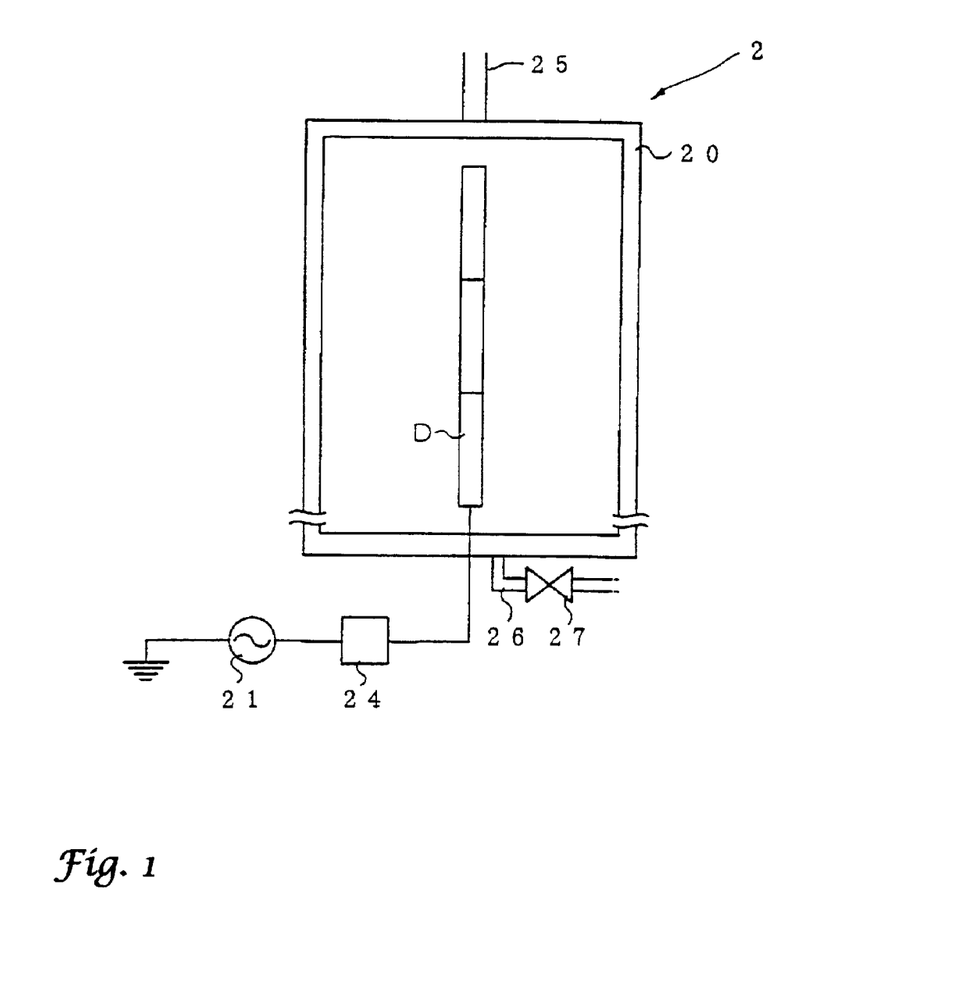
FIG. 1 is a schematic view showing an etching apparatus which is employed in one mode for carrying out the production process according to the present invention.

FIG. 1 shows an etching apparatus 2 employed in one mode for carrying out the production process according to the present invention. The etching apparatus 2 has a chamber 20 accommodating a disk to be etched and a high-frequency power source 21 applying high-frequency electric power to the disk accommodated in the chamber 20. Reference numeral 24 denotes a matching apparatus.

A conduit 25 is connected to chamber 20 for feeding into the chamber 20 an etching gas supplied from a supply source (not shown), and an exhaust pipe 26 is connected to chamber 20 for exhausting a gas contained in the chamber 20. The exhaust pipe 26 is equipped with a discharge amount control valve 27 through which exhaust flow is adjusted to thereby arbitrarily control the gas pressure in the chamber 20.

Figure 2:
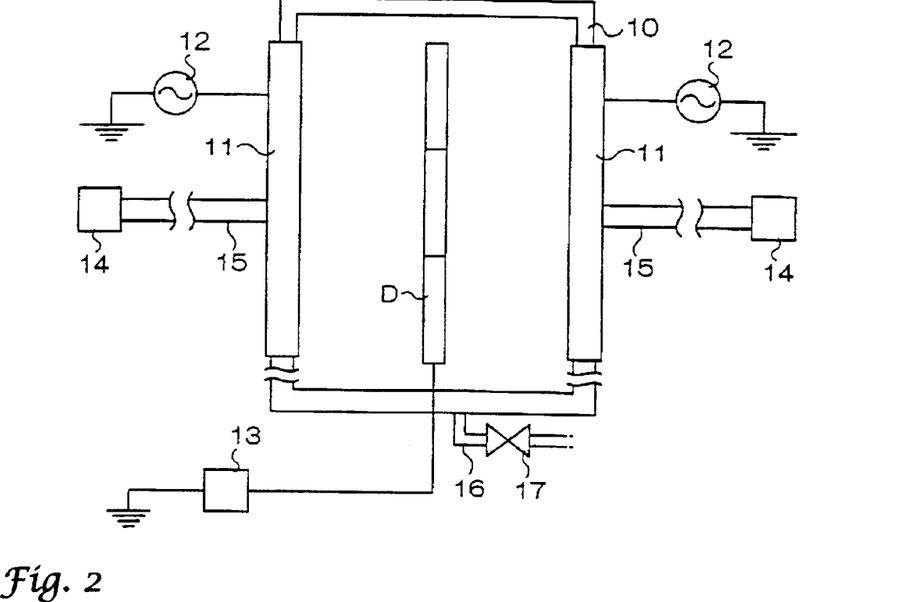
FIG. 2 is a schematic view showing a plasma CVD apparatus which is employed in one mode for carrying out the production process according to the present invention.

FIG. 2 is a schematic representation of a plasma CVD apparatus 1 used for carrying out one mode of the present invention. The apparatus comprises a chamber 10 accommodating a disk on which a protective film is to be formed; electrodes (11, 11) provided on opposing walls in the chamber 10 so as to face each other; high-frequency power sources (12, 12) for supplying power to the electrodes (11, 11); a bias power source 13 which is connected to the disk in the chamber 10; and a gas supply source 14 for supplying a process gas serving as a raw material of the protective film which is to be formed on the disk.

The chamber 10 is connected to conduits (15, 15) for feeding process gas fed into the chamber 10 from the gas supply source 14, and an exhaust pipe 16 for discharging gas from the chamber 10. The exhaust pipe 16 has an exhaust control valve 17, which may be controlled to thereby arbitrarily set the gas pressure in the chamber 10.

A pulse DC source or a high-frequency source may be used as the bias power source 13.

The plasma CVD apparatus 1 and the etching apparatus 2 are connected with each other so as to transfer the disk D accommodated in the plasma CVD apparatus 1 into the etching apparatus 2 without involving exposure to air.

One mode of the production process for a magnetic recording medium according to the present invention will next be described, taking the apparatus shown in FIGS. 1 and 2 as examples.

Firstly, by sputtering or any suitable method, each of the two sides of a non-magnetic substrate is coated with a non-magnetic undercoat film and a magnetic film, to thereby obtain a disk D.

A substrate typically used for a magnetic recording medium can be used as the non-magnetic substrate, and an aluminum alloy substrate plated with an Ni—P film and a substrate formed of glass or silicon may be used. The surface of the non-magnetic substrate is preferably subjected to a texturizing treatment such as a mechanical texturizing treatment. Particularly, a substrate having a surface average roughness (Ra) of about 1–20 Å is preferably used.

Cr or a Cr alloy may be used for forming a non-magnetic undercoat film. Examples of suitably used Cr alloys include Cr/Ti alloys, Cr/w alloys, Cr/V alloys, and Cr/Si alloys.

A Co alloy may be used for forming a magnetic film. Examples of suitably used Co alloys include Co/Cr alloys, Co/Cr/Ta alloys, Co/Cr/Pt alloys, and Co/Cr/Pt/Ta alloys.

These non-magnetic undercoat films and magnetic films preferably have a thickness of about 50–1000 Å and about 50–800 Å, respectively.

Subsequently, the disk D is transferred into the chamber 10 of the plasma CVD apparatus 1 shown in FIG. 2, and a raw material gas fed from gas supply sources 14 is introduced into the chamber 10 through the conduits 15, to thereby exhaust the gas in the chamber 10 through the exhaust pipe 16. The process gas flows in the chamber 10, to thereby expose a surface of the disk D to the gas.

A process gas containing hydrocarbon, e.g., a gas predominantly comprising a mixture of hydrocarbon and hydrogen may be used.

One or more hydrocarbons selected from lower saturated hydrocarbons, lower unsaturated hydrocarbons, and lower cyclic hydrocarbons are preferably used as the hydrocarbon.

Examples of lower saturated hydrocarbons which may be used include methane, ethane, propane, butane, and octane. Examples of lower unsaturated hydrocarbons which may be used include isoprene, ethylene, propylene, butylene, and butadiene. Examples of lower cyclic hydrocarbons which may be used include benzene, toluene, xylene, styrene, naphthalene, cyclohexane, and cyclohexadiene. The term "lower" refers to the number of carbon atoms in the hydrocarbon and means 1–10 carbon atoms.

The gas pressure in the chamber 10 is preferably 0.1–10 Pa.

Simultaneously, the high-frequency power sources 12, each preferably being a high-frequency power of about 50–2000 W, supply power to the electrodes 11, to thereby generate plasma. A carbonaceous protective film is formed on each side of the disk D through plasma CVD by use of the above process gas as a source.

The carbonaceous protective film has a thickness of about 30–100 Å, preferably 30–75 Å.

During formation of the carbonaceous protective film, the disk D is preferably subjected to a bias such as high-frequency bias or pulse DC bias by use of bias power source 13.

When high-frequency bias is employed as the bias, a high-frequency power source with a power of about 10–300 W, preferably 10–150 W, applies power to the disk D to thereby serve as the bias power source 13.

When pulse DC bias is employed as the bias, a pulse DC power source having a voltage (average voltage) ranging from about −400 to −10 V, preferably −300 to −50 V, supplies power to the disk D to thereby serve as the bias power source 13.

Preferably, the pulse width of the above pulse DC bias is about 10–50000 ns and the frequency thereof is about 10 kHz –1 GHz.

The carbonaceous protective film produced by use of the plasma CVD apparatus 1 contains a diamond-like carbon (DLC) component having high hardness and showing high mechanical strength.

The thus-formed carbonaceous protective film has a chemical activity with respect to the surface which is lower than that of a similar protective film formed through a process such as sputtering, since an active portion of the surface of the protective film responsible for film formation is hydrogenated to thereby provide a number of C—H bonds which are not easily polarized.

During formation of the carbonaceous protective film, the gas pressure in the chamber 10, power applied to electrodes 11, and other conditions are preferably adjusted to thereby determine the B/A value of the carbonaceous protective film.

When an inert gas such as Ar is used as an etching gas during an etching operation described below, the B/A value is suitable controlled to about 1.22–1.65, preferably 1.27–1.65, more preferably 1.29–1.65.

When a reactive gas such as $N_2$ is used as an etching gas, the B/A value is suitable controlled to about 1.21–1.52, preferably 1.24–1.52.

When the B/A value is less than the lower limit of the above range, the activity of the surface protective film increases to thereby cause excessive affinity for a lubricant during an etching process described below.

Specifically, when the B/A value is less than the lower limit of the above range, a hydrocarbon-derived polymer present in the protective film decreases to thereby result in a decrease in chemically inactive C—H bonds and an increase in active bonds such as C=C and C≡C present in a DLC component. These excessive chemically active bonds cause excessive affinity to a lubricant during an etching process described below.

Generally, a lubricating film comprises an upper surface portion which exhibits lubricity for reducing surface friction and a lower core portion which bonds directly to a film (e.g., a protective film). When there is excessive affinity of the surface of the protective film to a lubricant, the thickness of the lower core portion increases and the thickness of the upper surface portion decreases. Thus, lubricity of the upper surface portion decreases to thereby elevate the friction coefficient of the lubricating film.

Therefore, when the B/A value is less than the lower limit of the above range, the CSS (Contact-Start-Stop test) characteristic of the produced magnetic recording medium might be deteriorated.

In contrast, when the B/A value is in excess of the upper limit of the above range, chemically inactive C—H bonds present in the protective film increase in number. These excessive chemically inactive bonds cause poor affinity to a lubricant during etching described below, and bonding strength between the lubricating film and the protective film disadvantageously decreases.

The B/A value obtained from Raman spectroscopy represents a ratio of a peak value B at the G peak, which is an overall peak value including a fluorescence component, to a peak value A, which is a net peak value including no fluorescence component.

A large B/A value indicates that the protective film contains a large amount of a hydrocarbon-derived polymer component, whereas a small B/A value indicates that the protective film contains a small amount of a hydrocarbon-derived polymer component but contains a large amount of a DLC component or a graphite component.

After completion of formation of a carbon protective film, residual process gas in the chamber 10 could be deposited on the surface of protective film as an impurity.

In the mode of the production process according to the present invention, the disk D coated with carbonaceous protective films is conveyed to the chamber 20 of the etching apparatus 2 as shown in FIG. 1, and etching of the protective films is carried out in the following manner.

Firstly, an etching gas is fed from a gas supply source, which is not shown in FIG. 1, through the conduit 25 into the chamber 20; while the gas in the chamber 20 is exhausted through the exhaust pipe 26. Each of the carbonaceous protective films formed on the disk D is etched by the etching gas flowing in the chamber 20.

No particular limitation is imposed on the etching gas, and any gas can be employed so long as a plasma can be generated with the gas.

Examples of etching gas include inert gases such as Ar, He, Ne, Kr, and Xe; and reactive gases such as $N_2$, $O_2$, $H_2$, organic nitrogen compounds, organic silicon compounds, organic fluorine compounds, and organic boron compounds.

Examples of organic nitrogen compounds which can be used include acetonitrile, pyridine, and trimethylamine. Examples of organic silicon compounds include tetramethylsilane and tetraethoxysilane. Examples of organic fluorine compounds include octafluorocyclobutane and octafluorocyclopentene. Examples of organic boron compounds include trimethylborane and triethylborane.

When an oxygen-containing gas such as $O_2$ is used as an etching gas, bonds that are easily polarized, such as $C\!=\!O$ and C—O—C, are formed on the surface of a protective film to thereby enhance activity of the surface as described below. In addition, any impurity adhering to the surface of the protective film is removed by oxidation to thereby advantageously clean the surface.

When an inert gas such as Ar is used as an etching gas, the etching gas hardly bonds to a component of a protective film during etching, and the component cannot be gasified and scattered. Thus, use of an inert etching gas prevents variation in the thickness of the protective film and facilitates determination of the film thickness as compared to the case of employment of an oxygen-containing etching gas which possibly forms a gas such as $CO_2$ through reaction of a component of the protective film and the etching gas.

When a reactive gas such as $N_2$ is used as an etching gas, the etching gas partially bonds to a component of the protective film. However, since a compound which is easily gasified is hardly formed, use of such a reactive etching gas also prevents variation in the thickness of the protective film and facilitates determination of the film thickness.

The gas pressure in the chamber 20 is preferably controlled to the following values by use of the discharge amount control valve 27 through which the exhaust flow is appropriately controlled to adjust the gas pressure in the chamber 20.

Specifically, the pressure is about 1.6–8 Pa, preferably 2.4–4.8 Pa, when an inert gas such as Ar is used as an etching gas, and is about 2.4–8 Pa, preferably 2.4–6 Pa, when a reactive gas such as $N_2$ is used as an etching gas.

When the gas pressure in the chamber 20 is less than the lower limit of the above range, activity of the surface of the protective film decreases to thereby reduce bonding strength between the protective film and the lubricating film; i.e., to lower an effect of enhancing fly-stiction characteristics of the magnetic recording medium. In contrast, when the gas pressure is in excess of the upper limit of the above range, the surface of the protective film is chemically unstable to thereby possibly lower durability.

Simultaneously, high-frequency electric power of preferably about 30–500 W, more preferably 30–300 W, even more preferably 30–200 W, generated by the high-frequency power source 21 is applied to the disk D so as to generate plasma by use of the above etching gas as a source. The carbonaceous protective films formed on the disk D are etched by the thus-generated plasma.

When the electric power applied to the disk D is less than the lower limit of the above range, the activity of the surface of the protective film decreases to thereby reduce the bonding strength between the protective film and the lubricating film; i.e., to lower an effect of enhancing fly-stiction characteristics of a magnetic recording medium. In contrast, when the electric power applied to the disk D is in excess of the upper limit of the above range, the surface of the protective film has chemically unstable conditions to thereby possibly lower durability.

Although no particular limitation is imposed on the frequency of the high-frequency electric power, a RF frequency of from about 100 kHz to about 60 MHz, preferably from about 150 kHz to about 30 MHz, more preferably from about 200 kHz to about 20 MHz is used. For example, a frequency of 400 kHz or 13.56 MHz can be used.

The duration of etching is about 2–6 seconds, preferably 3–5 seconds. When the duration is less than the lower limit of the above range, the activity of the surface of the protective film decreases to thereby reduce bonding strength between the protective film and the lubricating film; i.e., to lower an effect of enhancing fly-stiction characteristics of a magnetic recording medium. In contrast, when the duration is in excess of the upper limit of the above range, the surface of the protective film is chemically unstable to thereby possibly lower durability.

During etching, etching conditions such as the electric power applied to the disk D, duration of etching, and gas pressure in the chamber 20 are preferably controlled to thereby regulate the water contact angle of the protective film to about 70° or less, preferably 60° or less.

When the water contact angle is in excess of 70°, affinity of the protective film to a lubricant decreases to thereby reduce bonding strength between the protective film and the lubricant film.

While not desiring to be bound, the surface of the carbonaceous protective films etched in the etching apparatus 2 is chemically active due to the following reasons.

A number of C—H bonds present in the carbonaceous protective film are cleaved by plasma during etching. The resultant C forms a new bond such as $C\!=\!C$ or $C\!\equiv\!C$.

When a nitrogen- or oxygen-containing gas is used as an etching gas or the etched protective film is exposed to air, bonds such as $C\!=\!N$, $C\!\equiv\!N$, $C\!=\!O$, and C—O—C are also formed.

C generated through cleavage of a C—H bond has a highly active dangling bond. The above types of bonds are considered to be formed by coupling two dangling bonds or coupling a dangling bond with oxygen or nitrogen.

The activity of the surface of the protective film is based on electronegativity of atoms present in the protective film, particularly at the surface and dipole moment of a functional group.

The H, C, O, and N atoms have electronegativities of 2.1, 2.5, 3.5, and 3.0, respectively. The difference in electronegativity between two atoms of a C—H bond is 0.4, the difference in electronegativity between two atoms of a C=O bond is 1.0, and the difference in electronegativity between two atoms of a C=N bond is 0.5.

Since the bonds formed through etching such as C=O, C—O—C, C=N, C≡N, C=C, and C≡C have a comparatively large difference in electronegativity, the bonds are easily polarized and have a high ionic property and a large dipole moment. Thus, these bonds are chemically active.

Bonds such as C=C and C≡C have enhanced chemical activity due to n electrons; i.e., delocalized electrons.

As described above, an etched carbonaceous protective film is considered to be highly chemically active.

When an impurity is deposited on the protective film after completion of the process carried out in the plasma CVD apparatus 1, the impurity is removed from the protective film by plasma generated from an etching gas during the etching process.

The activity of the surface of a carbonaceous protective film can be evaluated in the following manner.

Firstly, the etched surface of the protective film is exposed to air (hereinafter referred to as an exposure step), to thereby couple oxygen with dangling bonds in the surface of the protective film.

Secondly, the amount of oxygen bound to the surface of the protective film during the exposure step is measured through X-ray photoelectron microscopy (ESCA) by use of the following equation: oxygen content (%)=(01s peak area)/(total peak area)×100. This value is considered to be related to the atomic counts of oxygen.

The activity is evaluated on the basis of oxygen content.

When a reactive gas such as $N_2$ is used as an etching gas, the reactive gas is considered to couple with dangling bonds in the surface of the protective film. Therefore, the amount of a reactive gas component; e.g., nitrogen, can be calculated through ESCA in a similar manner as that described above in relation to the oxygen content without carrying out the exposure step, to thereby evaluate the activity of the surface of the protective film.

During etching, etching conditions such as the electric power applied to the disk D, duration of etching, and gas pressure in the chamber 20 are preferably controlled such that the oxygen content in the protective film is about 2.9–12% as measured through ESCA, preferably 2.9–9.4%, more preferably 2.9–6.3%.

When the oxygen content is less than the lower limit of the above range, activity of the surface of the protective film decreases to thereby reduce bonding strength between the protective film and the lubricating film; i.e., to disadvantageously deteriorate fly-stiction characteristics.

In contrast, when the oxygen content is in excess of the upper limit of the above range, the activity of the surface of the protective film increases excessively, and further the thickness of the lower core portion increases and the thickness of the upper surface portion decreases, to thereby elevate the friction coefficient of the lubricating film. Thus, the magnetic recording medium obtained has a poor CSS characteristic.

Alternatively, during etching, etching conditions are preferably controlled such that the nitrogen content in the protective film is about 5.0–16.5% as measured through ESCA, preferably 5.0–12.4%, more preferably 5.0–9.4%.

When the nitrogen content is less than the lower limit of the above range, the activity of the surface of the protective film decreases to thereby lower bonding strength between the protective film and the lubricating film; i.e., to disadvantageously deteriorate fly-stiction characteristics.

In contrast, when the nitrogen content is in excess of the upper limit of the above range, the activity of the surface of the protective film increases excessively, and further the thickness of the lower core portion increases and the thickness of the upper surface portion decreases, to thereby elevate the friction coefficient of the lubricating film. Thus, the obtained magnetic recording medium has a poor CSS characteristic.

Subsequently, a lubricant such as a Fonbrin lubricant or perfluoropolyether is applied to the protective film through a method such as dipping, to thereby form a lubricating film. Thus, a magnetic recording medium is produced.

The lubricating film formed on the protective film bonds strongly to the surface of the protective film.

The strong bonding is based on the following reasons.

The above lubricant typically comprises a compound having a hydroxyl group.

As described above, the surface of the protective film has a high chemical activity.

Therefore, a hydroxyl group present in the lubricant bonds strongly to easily polarizable groups such as C=O, C—O—C, C=N, and C≡N through hydrogen bonding and to π n electron-containing groups such as C=C and C≡C through Van der Waals bonding.

Thus, the lubricating film is bonded strongly to the surface of the protective film.

Figure 3:
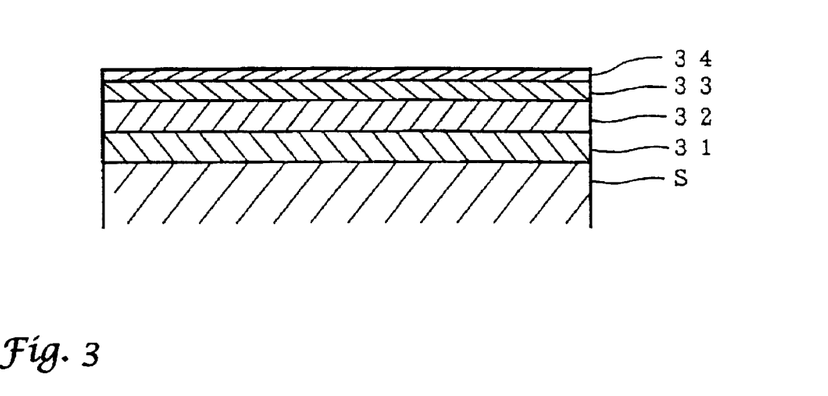
FIG. 3 is a cross-sectional view of one example of the magnetic recording medium of the present invention.

One example of a magnetic recording medium produced through the above-described production process is shown in FIG. 3.

The magnetic recording medium comprises a non-magnetic substrate S on which a non-magnetic undercoat film 31, a magnetic film 32, a carbonaceous protective film 33, and a lubricating film 34 are sequentially formed.

In the production process, the carbonaceous protective film is etched by use of plasma generated from an etching gas prior to formation of the lubricating film. Therefore, the protective film has a chemically active surface where a lubricant easily bonds to the surface.

In addition, any impurity deposited on the surface of the protective film can be removed from the surface, and deterioration of applicability of a lubricant to the protective film induced by the impurity can be prevented.

Thus, the bonding strength between the protective film and the lubricating film increases. Even when a magnetic recording medium is forced to rotate for a long time with a head floated above the medium, adhesion of fragments of a lubricating film released from another portion to the head is prevented and the friction coefficient between the head and medium decreases, to thereby enhance fly-stiction characteristics.

When the plasma CVD apparatus 1 and the etching apparatus 2 are connected to each other so as to enable conveyance of the disk D accommodated in the plasma CVD apparatus 1 to the etching apparatus 2 without exposure to air, adhesion of an impurity originating from air onto the protective film is prevented, and furthermore, reduction of bonding strength between the protective film and the lubricating film caused by the impurity is prevented.

The magnetic recording medium produced through the above-described production process may be etched so as to have an oxygen content in the surface of the carbonaceous protective film of about 2.9–12% as measured through ESCA.

As a result of the above treatment, the protective film has a highly chemically active surface where a lubricant easily bonds to the surface and bonding between the protective film and the lubricating film increases, to thereby enhance fly-stiction characteristics.

Alternatively, a similar effect can be provided when the nitrogen content in the surface of the carbonaceous protective film is adjusted through etching to about 5.0–16.5% as measured through ESCA.

Figure 4:
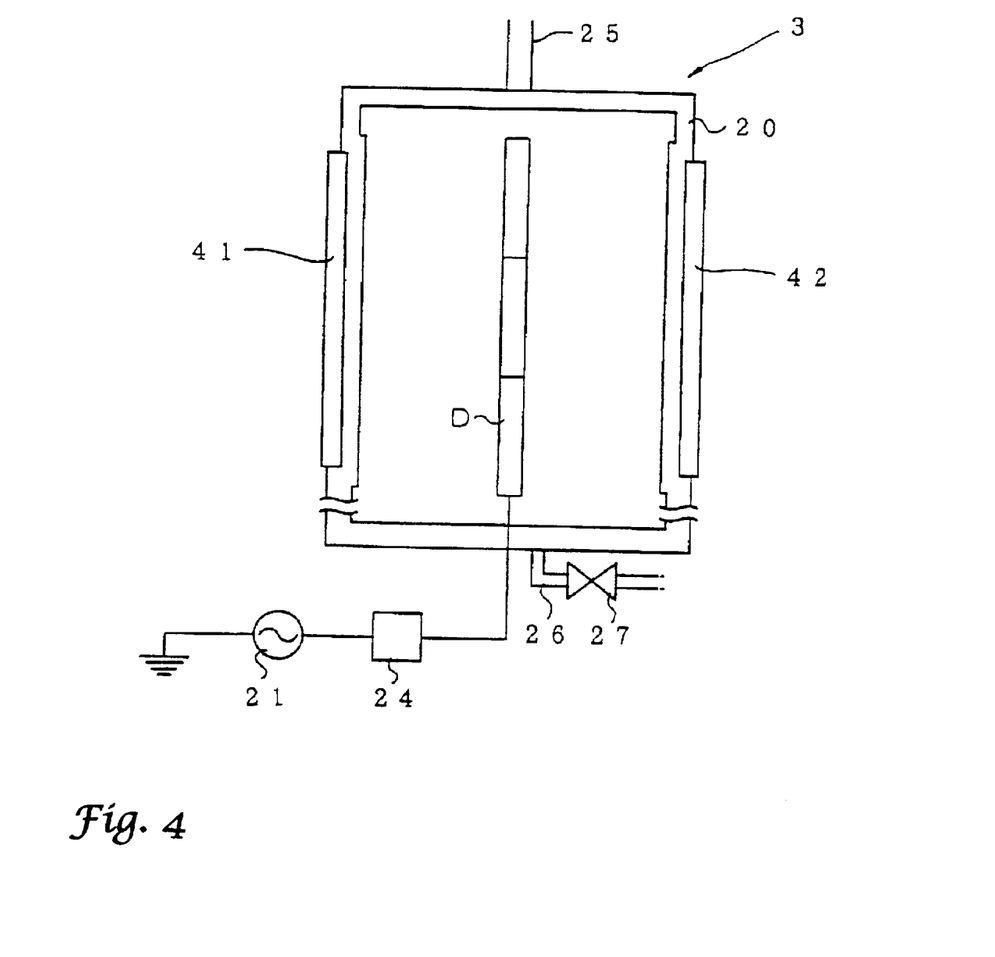
FIG. 4 is a schematic view showing an etching apparatus which is employed in another mode for carrying out the production process according to the present invention.

In the present invention, an etching apparatus 3 shown in FIG. 4 may be employed instead of the etching apparatus 2. The etching apparatus 3 differs from the apparatus 2 in coils (41, 42) for generating the magnetic field in the chamber 20, which coils are provided on the outer sides of the chamber 20.

When the apparatus is employed, plasma generated in the chamber 20 can be focused on the disk D by a magnetic field generated by the coils (41 and 42) during etching, to thereby enhance etching efficiency.

The following examples are given to illustrate the invention in greater details. They are not to be construed as limiting the present invention. Unless otherwise indicated, all parts, percents, ratios and the like are by weight.

EXAMPLES

Test Examples 1 to 19

An aluminum alloy substrate (diameter 95 mm, thickness 0.8 mm) plated with NiP was subjected to mechanical texture processing, to thereby adjust the surface roughness (Ra) to 6 Å. On each surface of the thus-obtained substrate S, a non-magnetic undercoat film 31 formed of a Cr alloy and a magnetic film 32 formed of a Co alloy were sequentially formed by use of a DC magnetron sputtering apparatus (Type 3010, product of ANELVA CORPORATION), to thereby produce a disk D.

The disk D was conveyed into the chamber 10 of the plasma CVD apparatus 1, and a toluene-hydrogen mixture gas (toluene:hydrogen=1:10 (volume ratio)) serving as a raw material gas was fed into the chamber 10.

Simultaneously, high-frequency electric power (800 W, 13.56 MHz) was applied to the electrode 11 so as to generate a plasma, and a carbonaceous protective film 33 having a thickness of 50 Å was formed on each surface of the disk D. The temperature of the disk D and film-forming rate during formation of the protective film was 170° C. and 400 Å/min, respectively.

Subsequently, the disk D on which the carbonaceous protective films 33 were formed was conveyed into the chamber 20 of the etching apparatus 2, and Ar serving as an etching gas was fed into the chamber 20 at a flow rate of 200 sccm.

Simultaneously, high-frequency electric power (13.56 MHz) was applied to the disk D to thereby generate a plasma, and each surface of the carbonaceous protective films formed on the disk D was etched.

The high-frequency electric power (W) applied to the disk D during etching, application time (seconds), and gas pressure in the chamber 20 (Pa) are shown in Table 1 below.

After exposure of the etched disk D to air, the oxygen content in the surface of the protective film 33 was measured by use of an ESCA apparatus (Sage 100, product of Specs) based on the following equation:

$$\text{oxygen content } (\%) = (\text{O1s peak area})/(\text{total peak area}) \times 100.$$

The results obtained are shown in Table 1 below.

The specification of the apparatus and conditions for measurement are described below:

Anode: aluminum

Spot size: 2–3 mm

Method used for obtaining the area: fitting method (C: Gaussian fitting; N, O: Gaussian+Lorentz fitting).

In addition, the carbonaceous protective film 33 was analyzed using Raman spectromerty (light source: Ar laser, wavelength: 514.5 nm, power: 100 mW, exposure: 10 seconds, and the method for obtaining area: Gaussian fitting) by use of a Raman spectroanalyzer (product of Jobin-Yvon). The results obtained are also shown in Table 1.

Furthermore, the lubricating film 34 was formed by immersion on a surface of the carbonaceous protective film 33 to thereby produce a magnetic recording medium. The bonded ratio of the medium was measured. The results obtained are shown in Table 1.

The measurement was carried out in the following manner.

The above-described magnetic recording medium was dipped in a solvent (AK 225, product of Asahi Glass Co., Ltd.) for 15 minutes and removed from the solvent. The ratio (%) of the thickness of the lubricating film 34 after dipping to that before dipping was calculated. The thickness of the lubricating film 34 was measured at 20 mm in the radius through FT—IR.

In addition, the water contact angle (°) of the protective film 33 was measured. The results obtained are also shown in Table 1.

TABLE 1

| | RF Applied Power (W) | RF Application Time (s) | Etching Gas (Ar) Pressure (Pa) | Water Content Angle (°) | Bonded Ratio (%) | Oxygen Content (%) | Raman Analysis | | |
|---|---|---|---|---|---|---|---|---|---|
| | | | | | | | G-line (cm$^{-1}$) | Id/Ig (—) | B/A (—) |
| Test Ex. 1 | 0 | 0 | none | 74.6 | 25.9 | 2.5 | 1532 | 0.62 | 1.86 |
| Test Ex. 2 | 20 | 3 | 4.6 | 60.3 | 37.6 | 2.8 | 1537 | 0.71 | 1.77 |
| Test Ex. 3 | 30 | 3 | 4.6 | 54.7 | 38.3 | 2.9 | 1540 | 0.84 | 1.65 |
| Test Ex. 4 | 50 | 3 | 4.6 | 53.5 | 42.4 | 3.4 | 1543 | 0.96 | 1.47 |
| Test Ex. 5 | 70 | 3 | 4.6 | 56.7 | 45.3 | 4.7 | 1544 | 0.99 | 1.39 |
| Test Ex. 6 | 100 | 3 | 4.6 | 53.1 | 47.3 | 6.3 | 1546 | 0.91 | 1.35 |
| Test Ex. 7 | 200 | 3 | 4.6 | 44.9 | 49.4 | 8.1 | 1548 | 1.15 | 1.29 |
| Test Ex. 8 | 300 | 3 | 4.6 | 32.4 | 51.3 | 9.7 | 1549 | 1.23 | 1.27 |
| Test Ex. 9 | 500 | 3 | 4.6 | 44.3 | 51.0 | 11.5 | 1551 | 1.29 | 1.25 |
| Test Ex. 10 | 100 | 1 | 4.6 | 65.8 | 30.8 | 2.6 | 1536 | 0.69 | 1.82 |

TABLE 1-continued

|  | RF Applied Power (W) | RF Application Time (s) | Etching Gas (Ar) Pressure (Pa) | Water Content Angle (°) | Bonded Ratio (%) | Oxygen Content (%) | Raman Analysis G-line (cm$^{-1}$) | Id/Ig (−) | B/A (−) |
|---|---|---|---|---|---|---|---|---|---|
| Test Ex. 11 | 100 | 2 | 4.6 | 60.2 | 38.4 | 4.2 | 1542 | 0.90 | 1.44 |
| Test Ex. 12 | 100 | 3 | 4.6 | 53.1 | 47.3 | 6.3 | 1546 | 0.91 | 1.35 |
| Test Ex. 13 | 100 | 4 | 4.6 | 49.5 | 50.4 | 7.5 | 1546 | 0.97 | 1.30 |
| Test Ex. 14 | 100 | 5 | 4.6 | 45.3 | 53.7 | 8.8 | 1547 | 1.08 | 1.27 |
| Test Ex. 15 | 100 | 6 | 4.6 | 44.8 | 52.9 | 9.4 | 1552 | 1.22 | 1.22 |
| Test Ex. 16 | 100 | 3 | 0.6 | — | — | — | — | — | — |
| Test Ex. 17 | 100 | 3 | 1.6 | 49.2 | 49.3 | 7.1 | 1548 | 0.97 | 1.33 |
| Test Ex. 18 | 100 | 3 | 2.4 | 55.7 | 45.1 | 5.9 | 1542 | 0.92 | 1.36 |
| Test Ex. 19 | 100 | 3 | 8 | 57.4 | 42.7 | 5.3 | 1541 | 0.96 | 1.39 |

* No discharge occurred in the etching apparatus (Test Ex. 16).

Test Examples 20 to 37

The procedure of Test Examples 1 to 19 was repeated except that $N_2$ was used as an etching gas, to thereby produce a magnetic recording medium. The nitrogen content of the surface portion of the protective film 33 was measured through ESCA in the same manner as performed in relation to Test Examples 1 to 19.

In addition, Raman spectrometric analysis and measurement of the bonded ratio were carried out in the same manner as performed in relation to Test Examples 1 to 19. The results obtained are shown in Table 2.

TABLE 2

|  | RF Applied Power (W) | RF Application Time (S) | Etching Gas ($N_2$) Pressure (Pa) | Water Content Angle (°) | Bonded Ratio (%) | Nitrogen Content (%) | Raman Analysis G-line (cm$^{-1}$) | Id/Ig (−) | B/A (−) |
|---|---|---|---|---|---|---|---|---|---|
| Test Ex. 20 | 0 | 3 | none | 74.6 | 25.9 | 0.0 | 1532 | 0.62 | 1.86 |
| Test Ex. 21 | 20 | 3 | 4.6 | 61.8 | 30.3 | 4.9 | 1545 | 1.14 | 1.50 |
| Test Ex. 22 | 30 | 3 | 4.6 | 59.4 | 33.8 | 5.2 | 1550 | 1.23 | 1.52 |
| Test Ex. 23 | 50 | 3 | 4.6 | 51.1 | 38.7 | 6.7 | 1551 | 1.30 | 1.51 |
| Test Ex. 24 | 70 | 3 | 4.6 | 45.3 | 42.2 | 7.5 | 1553 | 1.54 | 1.47 |
| Test Ex. 25 | 100 | 3 | 4.6 | 42.6 | 49.8 | 9.4 | 1553 | 1.69 | 1.40 |
| Test Ex. 26 | 200 | 3 | 4.6 | 38.1 | 51.3 | 11.3 | 1555 | 1.88 | 1.34 |
| Test Ex. 27 | 300 | 3 | 4.6 | 35.7 | 55.2 | 13.2 | 1556 | 2.00 | 1.26 |
| Test Ex. 28 | 500 | 3 | 4.6 | 30.4 | 57.5 | 16.2 | 1558 | 2.48 | 1.21 |
| Test Ex. 29 | 100 | 1 | 4.6 | 58.2 | 32.7 | 6.1 | 1542 | 1.17 | 1.54 |
| Test Ex. 30 | 100 | 2 | 4.6 | 49.3 | 40.1 | 7.5 | 1548 | 1.31 | 1.49 |
| Test Ex. 31 | 100 | 3 | 4.6 | 42.6 | 49.8 | 9.4 | 1553 | 1.69 | 1.40 |
| Test Ex. 32 | 100 | 4 | 4.6 | 38.4 | 51.3 | 11.1 | 1553 | 1.75 | 1.32 |
| Test Ex. 33 | 100 | 5 | 4.6 | 38.8 | 51.7 | 12.0 | 1554 | 1.86 | 1.24 |
| Test Ex. 34 | 100 | 6 | 4.6 | 36.2 | 52.6 | 12.4 | 1555 | 1.99 | 1.22 |
| Test Ex. 35 | 100 | 3 | 1.6 | — | — | — | — | — | — |
| Test Ex. 36 | 100 | 3 | 2.4 | 43.8 | 48.7 | 10.2 | 1554 | 1.73 | 1.36 |
| Test Ex. 37 | 100 | 3 | 8 | 47.9 | 44.5 | 8.9 | 1553 | 1.65 | 1.44 |

* No discharge occurred in the etching apparatus (Test Ex. 35).

As is clear from the results in Tables 1 and 2, the bonded ratio of the surface of the carbonaceous protective film 33 is higher for the etched test samples (Test Examples 2 to 19 and 21 to 37) than for the non-etched test samples (Test Examples 1 and 20).

Therefore, a magnetic recording material has been produced where separation of a lubricant does not easily occur and excellent fly-stiction characteristics arise.

Particularly, test samples having an oxygen content in the surface of the protective film measured through ESCA of 2.9–12% and a similar nitrogen content of 5.0–16.5% showed excellent fly-stiction characteristics.

As described hereinabove, the present invention provides a production process for a magnetic recording medium, in which the surface of a carbonaceous protective film is etched by use of a plasma generated from an etching gas prior to formation of a lubricating film. Thus, the surface of the protective film is highly active so as to achieve strong bonding of a lubricant to the surface and any impurity adhered on the surface can be removed from the surface.

Briefly, the bonding strength between the protective film and the lubricating film increases to thereby enhance fly-stiction characteristics of the magnetic recording medium.

While the invention has been described in detail and with reference to specific embodiments thereof, it will be apparent to one skilled in the art that various changes and modifications can be made therein without departing from the spirit and scope thereof.

What is claimed is:

1. A magnetic recording medium produced using a process for producing a magnetic recording medium which comprises the steps of (i) forming a non-magnetic undercoat film and a magnetic film on a non-magnetic substrate to produce a disk, (ii) forming a carbonaceous protective film thereon through plasma chemical vapor deposition, (iii)

etching a surface of the carbonaceous protective film by use of plasma generated from an etching gas, during the etching of the surface of the carbonaceous protective film, applying a high-frequency electric power onto a disk, and (iv) forming a lubricating film, wherein, oxygen is present in the surface of the carbonaceous protective film in an amount of about 2.9 to 12% as measured using X-ray photoelectron spectrometry, a B/A value of the carbonaceous protective film is about 1.22 to 1.65 as measured using Raman spectrometric analysis, a water contact angle of the carbonaceous protective film is about 70° or less, and a thickness of the carbonaceous protective film is 30–100 Å.

2. A magnetic recording medium produced using a process for producing a magnetic recording medium which comprises the steps of (i) forming a non-magnetic undercoat film and a magnetic film on a non-magnetic substrate to produce a disk, (ii) forming a carbonaceous protective film thereon through plasma chemical vapor deposition, (iii) etching a surface of the carbonaceous protective film by use of plasma generated from an etching gas, during the etching of the surface of the carbonaceous protective film, applying a high-frequency electric power onto a disk, and (iv) forming a lubricating film, wherein, nitrogen is present in the surface of the carbonaceous protective film in an amount of about 5.0–16.5% as measured using X-ray photoelectron spectrometry, a B/A value of the carbonaceous protective film is about 1.21–1.52 as measured using Raman spectrometric analysis, a water contact angle of the carbonaceous protective film is about 70° or less, and a thickness of the carbonaceous protective film is 30–100 Å.

* * * * *